No. 684,582. Patented Oct. 15, 1901.
J. F. McGUIRE.
PROTECTOR CLAMP FOR AIR HOSE.
(Application filed Mar. 15, 1901.)
(No Model.)
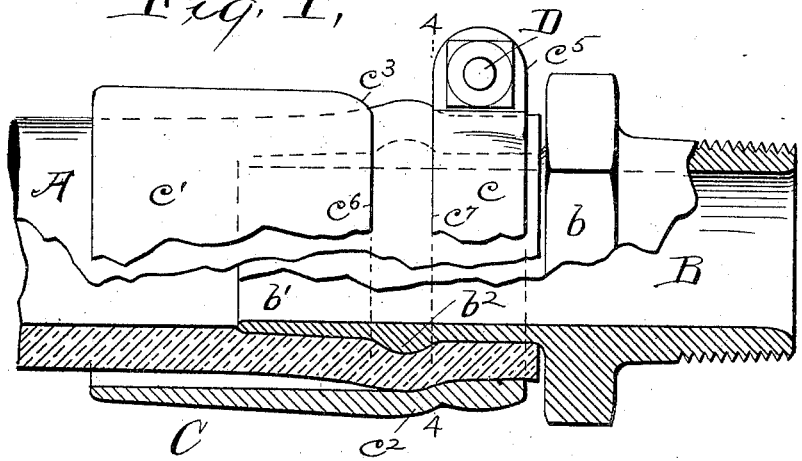
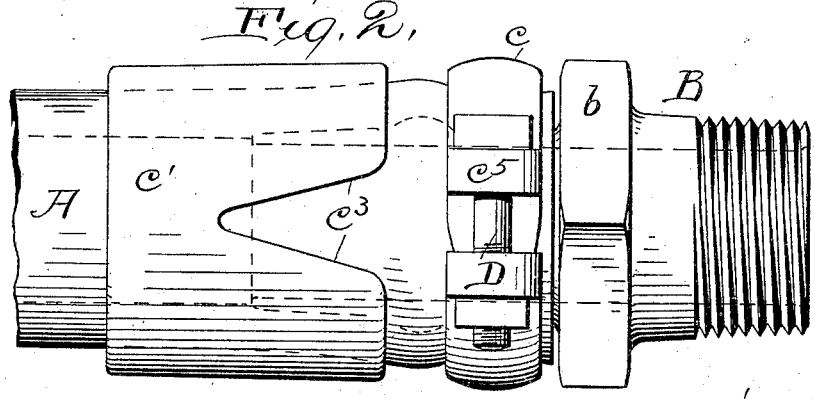
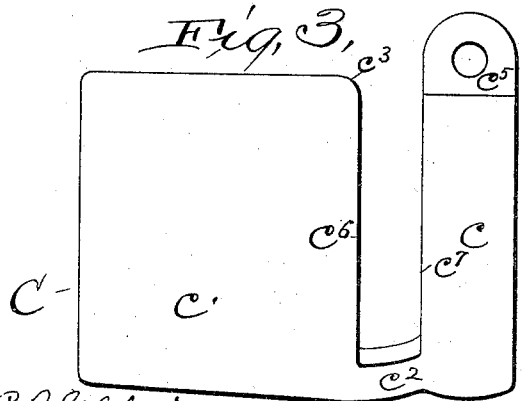
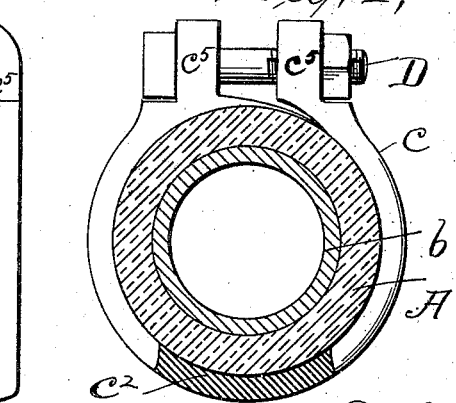
Witnesses. Inventor.

UNITED STATES PATENT OFFICE.

JOHN F. McGUIRE, OF AKRON, OHIO, ASSIGNOR OF TWO-THIRDS TO THOMAS H. BARRETT AND JOSEPH SEABOLD, OF SAME PLACE.

PROTECTOR-CLAMP FOR AIR-HOSE.

SPECIFICATION forming part of Letters Patent No. 684,582, dated October 15, 1901.

Application filed March 15, 1901. Serial No. 51,331. (No model.)

*To all whom it may concern:*

Be it known that I, JOHN F. MCGUIRE, a citizen of the United States, residing at Akron, in the county of Summit and State of Ohio, have invented a certain new and useful Improvement in Protector-Clamps for Air-Hose, of which the following is a full, clear, and exact description, reference being had to the accompanying drawings.

The pieces of flexible rubber hose which are used to connect the air-pipes on railway-cars have metallic connections secured to their ends. Each of these connections includes a tubular nipple, which is inserted into the end of the hose. It is necessary that these two parts (hose and nipple) be securely fastened together and that the joint be air-tight. In use this flexible hose is especially liable to be injured, particularly in that part which embraces and is adjacent to the inclosed nipple.

The object of the present invention is to provide a single simple device which will act both to clamp the hose upon the nipple and to protect the part of the hose referred to.

The invention consists of a combined split annular clamp and a tubular sleeve, said two parts being connected by and integral with a narrow web, substantially as shown and hereinafter described, and pointed out definitely in the claims.

In the drawings, Figure 1 is a side elevation, partly in section, of my improved protector-clamp in operative position. Fig. 2 is a plan view of the same. Fig. 3 is a side elevation of the protector-clamp itself, and Fig. 4 is a sectional view on line 4 4 of Fig. 1.

Referring to the parts by letters, A represents the end of a flexible hose made of rubber and fabric or any other suitable and usual material.

B represents one of the metallic connecting-pieces, which is of substantially the usual form, having a head $b$ and the tubular nipple $b'$, adapted to be crowded into the end of the hose. On the outside of this nipple, a suitable distance back from the head $b$, is an external annular rib $b^2$.

C represents my improved protector-clamp. At one end it comprises a split clamping-ring $c$, adapted to embrace the hose and nipple between the head $b$ and the rib $b^2$ and to firmly clamp the hose upon said nipple. It is provided with ears $c^5 c^5$, through which the clamping-bolt D passes. $c'$ represents the protector part of this device, which is of somewhat larger internal diameter than the external diameter of the hose, although its internal diameter is approximately the same as that of the hose close to said rib $b^2$, as shown in Fig. 1. This sleeve portion $c'$ and clamp portion $c$ are connected together by an integral web $c^3$, which is approximately in the form of a sector of the sleeve $c'$ and is located opposite to the ears $c^5 c^5$. The proximate edges $c^6 c^7$ of the sleeve portion and the clamp portion, respectively, of this device are separated such a distance that the rib $b^2$ and that part of the hose which immediately embraces the same lie between said edges. There is therefore no pressure upon this part of the hose which might cause injury to it. At the same time the distance between these proximate edges is so small that the exposed part of the hose is not liable to come in contact with any external object and be injured thereby. In the edge $c^6$ of the sleeve part $c'$ of said protector-clamp is a notch $c^3$, of greater or less depth. This is not essential to the device; but the device is more adaptable and useful when it is constructed as shown, because the inner part of said protector-sleeve, if necessary, may by reason of this notch be slightly expanded, so that it will not press tightly against the hose, and thereby tend to cut it. The remote edge or end of this sleeve extends a considerable distance beyond the end of the nipple, and thereby prevents the hose from being bent across said end of said nipple. Some freedom of movement of the hose within the protector-sleeve is possible because of the difference in diameters. This freedom of movement is not sufficient to permit the hose to bend over the nipple enough to injure it; but it does permit some movement of the hose before the same comes in contact with the edge of the protector-sleeve, which might likewise injure it. The described device is exceedingly simple and cheap and is efficient for the purpose stated.

Having described my invention, I claim—

1. In combination with a flexible hose and metallic connection having a tubular nipple which is inserted into the end of the hose, of a protector-clamp having at one end, a split clamping-ring, and having, at its other end, a tubular protector-sleeve larger in diameter than the split ring, said clamping-ring and sleeve being connected by an integral web, substantially as and for the purpose specified.

2. In combination with a flexible hose, and a metallic connection having a tubular nipple which is inserted into the end of said hose and has an external annular rib, with a protector-clamp having at one end a split ring adapted to clamp the hose to the nipple on one side of said rib, and having also a sleeve of larger diameter than said clamp adapted to embrace the hose on the opposite sides of said rib, there being between said protector-clamp an annular space which is partly bridged by a narrow web connecting said clamp and sleeve, substantially as and for the purpose specified.

In testimony whereof I hereunto affix my signature in the presence of two witnesses.

J. F. McGUIRE.

Witnesses:
WM. J. O'NEIL,
A. P. LEHMANN.